Figure 1:
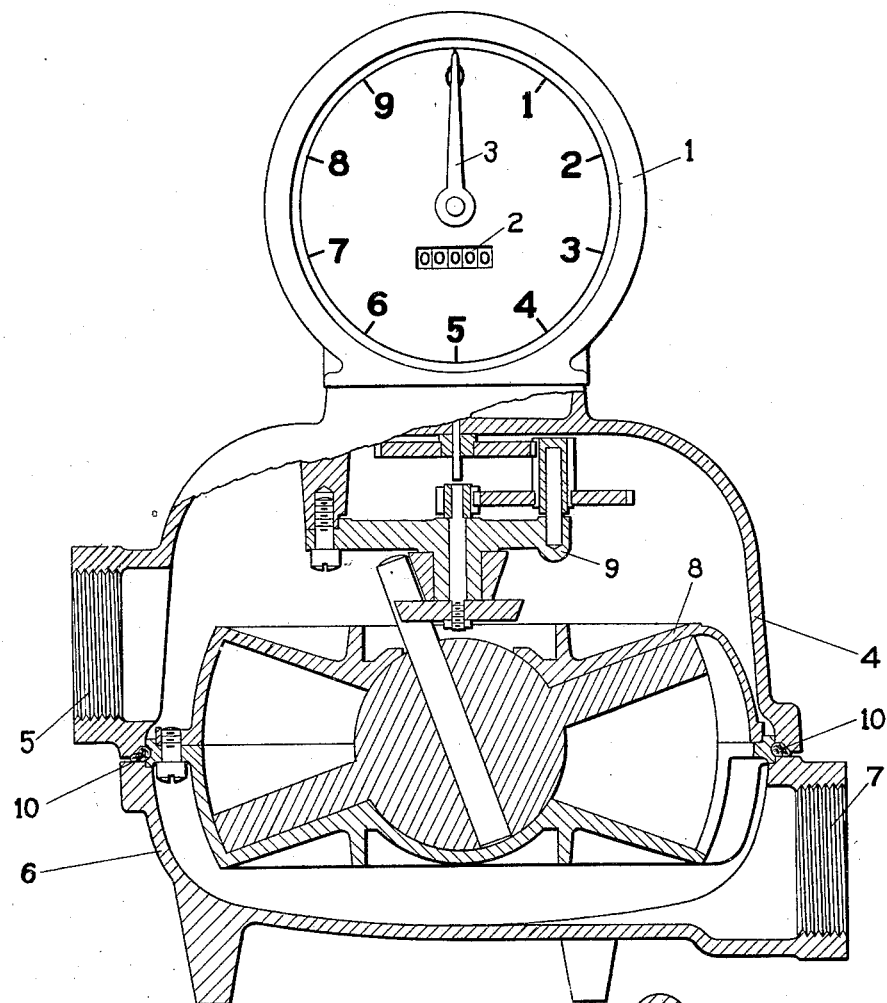
Figure 2:
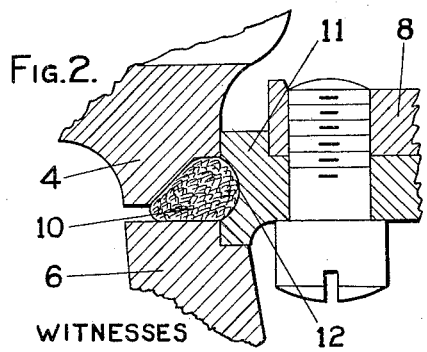

April 26, 1932.  R. S. BASSETT  1,855,277
LIQUID METER

Filed Dec. 6, 1928

WITNESSES
H. F. Barrett
E. R. Low.

INVENTOR
Robt. S. Bassett

Patented Apr. 26, 1932

1,855,277

UNITED STATES PATENT OFFICE

ROBERT S. BASSETT, OF BUFFALO, NEW YORK

LIQUID METER

Application filed December 6, 1928. Serial No. 324,286.

The general object of the invention is to provide a meter in which the casing can be taken apart quickly and easily for frequent cleaning. In order to make this provision in a satisfactory manner the various component parts of the meter must be so designed and constructed as to allow frequent re-assembling without damage to the parts themselves and with a minimum of labor.

In the accompanying drawings Figure (1) is a vertical section through the main body of the meter showing the interior working parts. This section is a broken section as the registering mechanism of the meter is not shown in section because it may be of any usual type.

Figure (2) is a detailed section through the outer casing gasket.

Figure (3) is a detailed section showing in detail a method for holding together the two halves of the meter casing.

In Figures (1, 2 and 3) (1) is the registering mechanism which may be any one of several constructions. As shown in the drawings this registering mechanism is of the vertical type with a totaling register (2) and indicating hand (3). Registering mechanism (1) is mounted on top casing (4) which is shown with connection (5) for connection to the flow line. Bottom casing (6) completes the outer casing of the meter and together with top casing (4) completely encloses the interior working parts of the meter. Bottom casing (6) is shown with connection (7) connecting to the flow line containing the liquid to be measured.

Measuring mechanism (8) is shown of the conventional nutating or nodding disc type but may be any other similar measuring device having a movement in direct proportion to the amount of liquid passing through the meter. (9) is the connecting mechanism for transmitting the motion of measuring mechanism (8) to registering mechanism (1). Connecting mechanism (9) is shown as a train of gears mounted on top casing (4), so that when the meter is open and bottom casing (6) is separated from top casing (4) and when measuring mechanism (8) is removed, the connecting mechanism (9) will not come apart but will remain in top casing (4) so that when top casing (4) is cleaned by placing in a cleaning vat, connecting mechanism (9) will be cleaned at the same time without requiring its dis-assembling with a possibility of losing some of the gears and other relatively small parts.

In Figures (2 and 3) a detailed view is shown of the joint between top casing (4) and bottom casing (6). (10) is the casing gasket which fits between the top casing and bottom casing so that the joint between these two casings will be liquid-tight. This gasket (10) is approximately triangular in cross section with rounded corners,—the "base" of the triangle being disposed at the periphery of said gasket and the "apex" of the triangle being disposed at the inner annular edge of said gasket. This arrangement provides that the measuring mechanism be restrained against vertical displacement by a maximum of gasket shearing strength and resilience and at the same time imposes a transverse force upon said gasket as the top and bottom casings are drawn together by the wing-nut, clamping eyebolts. In Figures (2 and 3) a small portion of measuring mechanism (8) is shown. In the drawings measuring mechanism (8) has a peripheral flange (11) to reinforce measuring mechanism (8) so as to withstand exterior pressure. As shown by the drawings, said top and bottom casings, (4) and (6), are both internally annularly machined to form counterbores at their inner faces adjacent to their meeting edges so as to snugly receive the outer peripheral annular surface of said measuring mechanism (8). The latter thus aligns said casings with respect to each other. On the outer periphery or longitudinal, outer, annular surface of measuring mechanism (8) I have provided an annular groove (12) to receive an annular, resilient casing gasket (10). By means of this construction casing gasket (10) by interlocking in groove (12) prevents measuring mechanism (8) from moving upward out of its normal working position, an important and novel feature in my meter.

In Figure (1) the meter is shown with flow connections (5 and 7) of which connection (5)

is in top casing (4) while casing (7) is in bottom casing (6). By means of this construction gasket (10) may be annular and top casing (4) and bottom casing (6) are much simpler in construction than if designed in the customary manner with both of the flow connections in one half of the outer casing.

It is necessary to provide holding means for fastening top casing (4) and bottom casing (6) together. The conventional construction is the use of ordinary machine bolts with small square or hexagon nuts which require the use of a wrench to hold the outer casing of the meter together in a liquid-tight manner.

Figure 3:
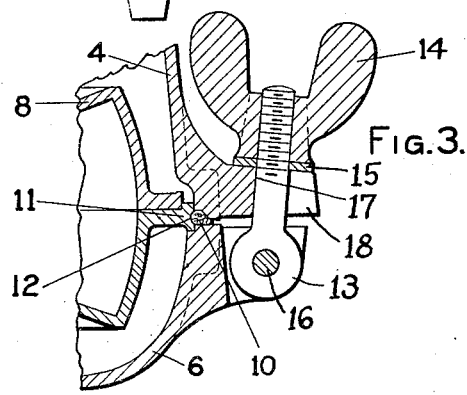

In my meter casing gasket (10) may be of a flexible resilient material such as rubber and by proportioning the gasket and the surfaces with which it comes in contact according to dimensions which have been worked out in actual practice, I have been able to use, for fastening together top casing (4) and bottom casing (6), holding means which can be easily turned by hand without the use of tools or wrenches. In the form shown in Figure 3, the holding means is an eye bolt (13) pivoted to the bottom casing (6) upon pivot (16). This construction prevents said bolt (13) from being detached and lost when the meter is dis-assembled. Eye bolt (13) is fitted with a wing nut (14) and washer (15). This eye bolt is not in a vertical position but is at a slight angle with the vertical axis of the meter by reason of the inclined abutment (17) which is disposed intermedially of a pair of clamping ears (18) which are arranged at the lower outer part of the top casing (4) and adapted to straddle the companion eye bolt (13). This eye bolt is not in a vertical position but is at a slight angle with the vertical axis of the meter by reason of the position of the inclined but approximately vertical abutment (17) which is disposed intermediately of a pair of clamping ears (18) which are arranged at the lower, outer part of the top casing (4) and are adapted to straddle the companion eye bolts (13). This construction is most efficient and in actual practice has been highly satisfactory in that a large wing nut (14) may be rotated about its axis without the same interfering with the top casing (4). Such a large wing nut enables the assembler to very tightly clamp the top and bottom casings together with a large and comfortably exerted pressure.

The entire construction of my meter provides an assembled mechanism which can be easily dis-assembled for cleaning and re-assembled and which can be re-assembled without the use of tools of any kind.

Having described the invention, what I claim as new and desire to secure by Letters Patent is:

1. In a liquid meter, a top casing, a bottom casing, a resilient casing gasket between said top casing and said bottom casing, and a measuring mechanism separable from said top casing and said bottom casing and having at its outer peripheral surface a groove engaging said casing gasket and holding said casing gasket against displacement in either direction parallel to the axis of said measuring mechanism, substantially as and for the purpose described.

2. In a liquid meter, a top casing having a face with a counterbore, a bottom casing having a face with a counterbore, a casing gasket between said top casing and said bottom casing and having an inside diameter less than the diameter of the counterbore of said top casing and the counterbore of said bottom casing, and a measuring mechanism separable from said top casing and said bottom casing and having at its outer peripheral surface a groove engaging the interior edge of said casing gasket, substantially as and for the purpose described.

3. In a liquid meter, a top casing having a face with a counterbore, a bottom casing having a face with a counterbore, an annular casing gasket between said top casing and said bottom casing and having an inside diameter less than the diameter of the counterbore of said top casing and the counterbore of said bottom casing, and a measuring mechanism separable from said top casing and said bottom casing and having at its outer peripheral surface a groove engaging the interior edge of said casing gasket, substantially as and for the purpose described.

4. In a liquid meter, a top casing, a bottom casing, an annular resilient casing gasket between said top casing and said bottom casing and having a cross-section approximately triangular with rounded corners, means for limiting radial movement of said gasket, and adjustable holding means for fastening said top casing, said casing gasket and said bottom casing together, said holding means having parts for direct manual adjustment, substantially as and for the purpose described.

ROBT. S. BASSETT.